April 29, 1952      J. A. LAUCK      2,594,460
POWER UNIT WITH THERMOSTATIC CONTROL
Filed Aug. 17, 1948
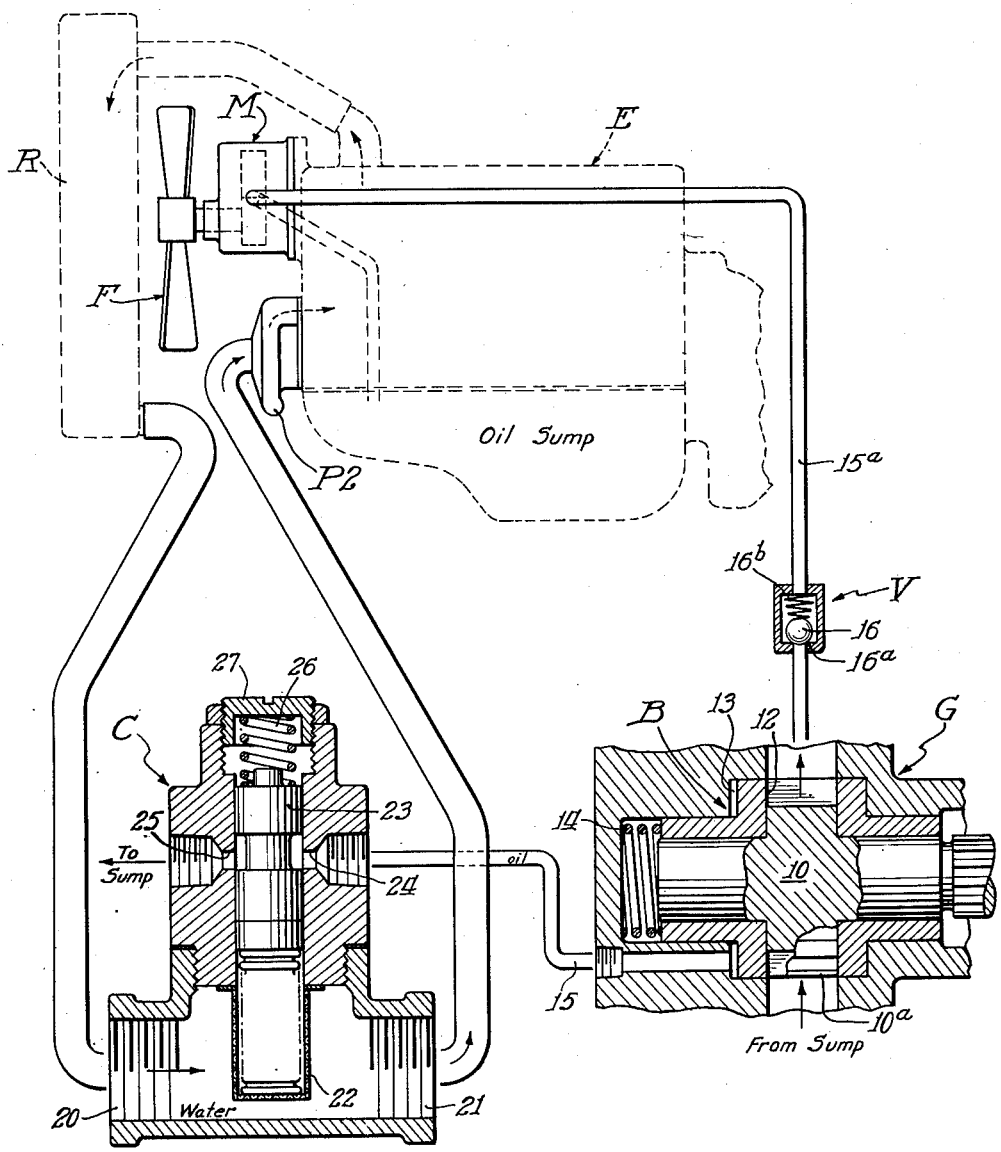

Patented Apr. 29, 1952

2,594,460

UNITED STATES PATENT OFFICE 2,594,460

POWER UNIT WITH THERMOSTATIC CONTROL

John A. Lauck, Shaker Heights, Ohio, assignor to Borg-Warner Corporation, Chicago, Ill., a corporation of Illinois Application August 17, 1948, Serial No. 44,664

5 Claims. (Cl. 236—35)

This invention relates to liquid pressure power units for intermittently driving a pressure responsive motor from a continuously driven gear pump type pressure generator, the unit being under the control of a temperature responsive thermostat; and relates particularly to an arrangement for driving the fan of an automotive vehicle intermittently in accordance with the demand for cooling.

It is an object of the present invention to provide an improved arrangement of a liquid pressure responsive motor, a continuously driven gear pump pressure generator, and thermostatically controlled means for interrupting and reestablishing the delivery of liquid pressure from the gear pump generator to the hydraulic motor.

It is a further object to provide an arrangement of the above character that is particularly adapted for driving the cooling fan for the coolant system of an automotive engine, wherein the temperature of the coolant is effective to sequentially cause the initiation and the discontinuance of delivery of liquid pressure from the pump to the hydraulic motor driving the fan.

It is a particular object to provide an arrangement of the above character wherein a pressure loadable and unloadable pump functions as the liquid pressure generator and has in combination therewith a thermostatic valve responsive to selected values of temperature in the medium being circulated to control the loading and unloading of the pressure generator, and thus to control the initiation and discontinuance of operation of the hydraulic motor served by the generator.

Other objects, advantages, and uses of the present invention will become apparent from a reading of the following specification taken in connection with the appended drawing and wherein:

Fig. 1 is a schematic layout view partially in section showing a preferred embodiment of the present invention wherein the initiation and discontinuance of pressure delivery to the motor is effected by a thermostatically controlled, liquid pressure loadable and unloadable bushing.

Referring in greater detail to the figure of the drawing a preferred embodiment of the present invention is shown as applied to the problem of driving the fan F of an automotive engine cooling system. It is important and desirable to rotate the fan F only when supplementary cooling is required and to discontinue rotation thereof when supplementary cooling is not needed. When the vehicle is standing still or operating at low speeds under relatively high temperature conditions, it is important to turn fan F rapidly in order to supplement the cooling effect of the air passing through radiator R for the purpose of properly regulating the operating temperature of engine E. When the vehicle is traveling at high speed, sufficient air is forced through radiator R and about engine E by the "ram" effect of the forward movement of the vehicle to produce the requisite cooling and under such conditions it is unnecessary that fan F be rotated for the purpose of drawing air through the radiator and about the engine. It is quite desirable to discontinue the rotation of the fan under such conditions in order to conserve the additional power that would be required to turn the fan were the same constantly connected to the power plant as in normal installations.

The present invention affords as a solution to this problem in its broader aspects, the provision of a liquid pressure generator G directly connected to the power plant and constantly driven, in combination with a liquid pressure responsive motor M directly connected to the fan F for driving the same. The present arrangement is particularly characterized by the provision of means effective to initiate the delivery of liquid pressure to the motor in response to the occurrence of selected high temperature conditions in the medium being circulated and further responsive to a pre-determined drop in the temperature of the medium being circulated to effect a discontinuance of the delivery of pressure liquid from the generator to the motor. As a preferred form of the means for accomplishing the present objective, there is provided a constantly driven, intermeshing gear type pressure generator G incorporating an axially adjustable end plate or bushing assembly indicated generally at B, arranged to be urged in the direction of the gear side face for the purpose of providing a liquid pumping seal when liquid pressure is to be delivered to the motor and arranged to have the pressure loading liquid relieved from acting on the end plate when it is desired to discontinue liquid pressure delivery.

For the purpose of either maintaining the loading pressure acting on the end plate assembly or for relieving the same therefrom, there is provided a thermostatically controlled valve indicated generally at C connected in the circuit of the coolant medium being circulated through the engine E and radiator R.

Referring in greater detail to the pressure generator G intermeshing gears 10 and 10a are provided on one side thereof with bearing and gear side face pumping seal providing bushings B (only one being shown for simplicity) including an inner face 12 adapted to engage the corresponding gear side face in liquid pumping seal relation and an outwardly facing surface area 13 arranged to be responsive to the liquid pressure generated by the gear pump G for normally holding the bushing in sealing relationship when the motor M is to drive fan F. For the purpose of assuring an initial pumping seal, coil compression spring 14 is interposed between the outer terminal of the bushing and the pump housing. Conduit 15 places pressure responsive surface 13 of the bushing in communication with thermostatically controlled valve C which is effective under certain conditions to maintain the pressure generated by the pump in contact with bushing surface 13 and under other conditions to relieve the same. While the liquid pressure generated by the pump or generator G may be placed in communication with the rear bushing surface area 13 in any desired manner, a preferred arrangement for accomplishing this is disclosed and claimed in Roth and Lauck Patent No. 2,420,622 to which reference is had for a more detailed understanding of pressure generator G. Particular attention is directed to Figs. 6 and 11 of this patent wherein it is disclosed that this communication may be accomplished by forming the necessary passage between the housing and the upper and lower bushing at the point of juncture thereof, on the high pressure side of the gear teeth and closing the corresponding passage against re-circulation of the liquid on the low pressure side of the gear teeth by means of a suitable closure plug.

One-way check valve V communicates with the outlet from gears 10, 10a and performs an important function in properly effecting the loading and unloading of the bushing assembly B. Check valve V includes ball check 16 urged in the direction of valve seat 16a by means of coil compression spring 16b.

By selecting the compression value of check valve spring 16b so that the check valve will not open except in response to the generator G delivering pressure at a level higher than the level which it is capable of delivering in the absence of liquid pressure loading on the motive surface 13 of bushing B, when the bushing B is unloaded by the opening of thermostatic valve C, no pressure will be delivered to the motor M.

This is explained by the fact that spring load imposed by coil compression spring 14 is necessarily such that the bearings will be maintained in sealing relation with the gear side face, even though the loading pressure on the back side thereof has been reduced by the operation of thermostatic control valve C. The output pressure that would result in the absence of ball check valve V has been found to be as high as 75 to 100 P. S. I. Pressures above this value would of course cause the bearing to move away from the gears. Therefore by providing ball check valve V and giving coil compression spring 16b a compression value slightly above that necessary to provide a back pressure of the order of 100 P. S. I., bushing assembly B will be forced away from the gear side face upon the operation of thermostatic control valve C sufficiently to thus relieve the pressure in line 15, prior to reaching a sufficient value to cause opening of valve V.

Thermostatically controlled valve C comprises an inlet 20 leading from radiator R and outlet 21 leading to the motor driven pump P-2 and to engine E.

Thermostatically responsive capsule 22 is interposed between the inlet and outlet of valve C for contact with the medium being pumped, which in the conventional vehicle engine is water. Spool valve 23 is arranged to open and close ports 24 and 25 dependent upon temperature conditions. Adjustable coil compression spring 26 urges valve 23 in the direction of thermostatically responsive capsule 22 with a selected force. Spring 26 may be confined within the housing of valve C by means of a threaded closure 27, effective to provide the requisite adjustment.

In operation it will be seen that the thermostatic capsule 22 and compression characteristics of coil spring 26 are chosen so as to normally maintain spool valve 22 in a position to close ports 24 and 25. This results in the liquid pressure being generated by pump P building up in communication with bushing surface area 13 and maintaining the forward face 12 in liquid pumping seal relation with the corresponding gear side face and in the delivery of liquid pressure to motor M, rotating fan F at a speed which is proportional to the speed of operation of the engine E to which the generator may be connected through one driving gear of pump gear 10.

As soon as the vehicle is moving at a sufficient rate of speed for the "ram" effect of the air to cool the water circulating through the radiator and cause the operation of valve C, the spool member 23 will be moved axially by the capsule 22, opening ports 24 and 25, thus relieving the loading pressure normally acting on pressure responsive surface 13, permitting the bushing face 12 to move out of pumping seal engagement with the associated gear side face and thus discontinue the delivery of pressure liquid to the motor M, permitting the same to idle. This reduces the work that the engine E must do by the amount of work required to turn the fan F at the high speed at which the engine is operating. It will be apparent that the values of speed, temperature and pressure may all be selectively chosen to suit the particular conditions of any installation.

While the present invention has been disclosed in connection with a specific embodiment thereof, it is to be understood that the same is to be defined by the appended claims, which should be given a scope commensurate with the prior art.

I claim:

1. In a power unit arrangement including a rotating type of liquid pressure responsive motor adapted to be intermittently driven; an intermeshing gear type of liquid pressure generator and temperature responsive means effective to initiate and to discontinue the delivery of liquid pressure from said generator to said motor, said temperature responsive means comprising an axially adjustable end plate within said generator having an inner surface area effective when held in engagement with the adjacent gear side face to provide a liquid pumping seal and having an axially oppositely facing surface area adapted to be responsive to the liquid pressure generated by said pump for holding said inner sealing surface area in sealing engagement with the gear side face, said end plate being axially adjustable in response to the release of said pressure on said second surface area effective to discontinue the delivery of pressure liquid from said generator to said motor and temperature responsive means including a valve effective in response to a selected value of temperature to relieve said loading pressure and responsive to a second value of temperature effective to maintain said loading pressure.

2. In a coolant system for an automative engine including means defining a circulating path for the motor coolant comprising an air-cooled radiator, a fan for assisting in drawing air through said radiator under predetermined temperature conditions, a rotary type of liquid pressure responsive motor for driving said fan intermittently, an intermeshing gear type of liquid pressure generator adapted to be continuously driven by said automotive engine, means responsive to a selected relatively high value of temperature of said coolant being circulated for initiating the delivery of liquid pressure from said generator to said motor for driving the same and responsive to a selected relatively low value of temperature of said coolant for causing the discontinuance of the delivery of liquid pressure from said generator to said motor, said last named means comprising a pressure loadable and unloadable bushing for engaging the gear side face in pumping seal relation in response to pressure generated by said pressure generator, and means including a thermostat and valve responsive to selected values of temperatures effective to maintain and to relieve said loading pressure on said bushing.

3. In a coolant system for an automative engine including means defining a circulating path of flow for motor coolant comprising an air-cooled radiator, a fan for assisting in drawing air through said radiator under predetermined temperature conditions in the coolant means defining a rotary pressure responsive motor drivingly connected with said fan, means defining a pressure generator for delivering driving pressure to said motor including a housing containing intermeshing gears adapted to be continuously driven by said automotive engine, axially adjustable end plate means within said housing engageable with the gear side faces from a position below the roots of the teeth to the radial outer extremities of said teeth throughout the circumferential extent thereof, compression spring means positioned between said housing and said end plate means effective to urge said end plate means in the direction of pumping seal engagement with a first predetermined relatively small force causing the generation of a pressure of the order of only a few pounds per square inch, said end plate means including an outwardly facing surface area effective in response to liquid pressure generated by said gears for urging said end plate means in pumping seal engagement with a second force supplementing the force of said compression spring means thus causing said gears to generate a relatively high value of pressure of the order of at least several hundred pounds per square inch, means defining a one-way check valve interposed between the outlet of said generator and the inlet of said pressure responsive motor including a ball check and a compression spring urging said ball check in the direction of said flow of liquid from said generator, said check valve spring having a compression value such that said small value of pressure is ineffective to open the same, and means including a thermostatically controlled valve responsive to a selected relatively low value of temperature in the coolant being circulated for relieving the loading pressure from said outwardly facing surface area for reducing the pressure being generated to said first predetermined relatively small value of pressure, and responsive to a selected relatively high value of temperature in the said coolant being circulated for causing said loading pressure to be again maintained in contact with said outwardly facing surface area for supplementing the action of said spring and causing the delivery of a second relatively high value of pressure to said fan motor for operating the same.

4. In a liquid pressure power system, a liquid pressure responsive motor connected in said system, an intermeshing gear type liquid pressure generator for supplying liquid pressure to said system, a thermostatic valve responsive to selected temperature conditions, and means in said pressure generator controlled by said thermostatic valve operative to vary the pressure output of said pressure generator from a minimum value to a maximum value.

5. In a liquid pressure power system, a liquid pressure responsive motor connected in said system, an intermeshing gear type liquid pressure generator for supplying liquid pressure to said system, a thermostatic valve responsive to selected temperature conditions, means in said pressure generator controlled by said thermostatic valve operative to vary the pressure output of said pressure generator from a minimum value to a maximum value, and means interposed between said pressure generator and said motor preventing delivery of liquid pressure from said generator to said motor at said minimum pressure value.

JOHN A. LAUCK.

REFERENCES CITED

The following references are of record in the file of this patent:

UNITED STATES PATENTS

| Number | Name | Date |
|---|---|---|
| 1,256,709 | Ludeman | Feb. 19, 1918 |
| 2,182,289 | Eisenlohr | Dec. 5, 1939 |
| 2,231,292 | Neugebauer | Feb. 11, 1941 |